United States Patent
Lai et al.

(10) Patent No.: US 10,021,418 B2
(45) Date of Patent: *Jul. 10, 2018

(54) METHOD AND APPARATUS OF CANDIDATE GENERATION FOR SINGLE SAMPLE MODE IN VIDEO CODING

(71) Applicant: HFI Innovation Inc., Zhubei, Hsinchu County (TW)

(72) Inventors: Wang-Lin Lai, San Jose, CA (US); Shan Liu, San Jose, CA (US); Yi-Wen Chen, Taichung (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/314,474

(22) PCT Filed: Jun. 18, 2015

(86) PCT No.: PCT/CN2015/081752
§ 371 (c)(1),
(2) Date: Nov. 28, 2016

(87) PCT Pub. No.: WO2015/192780
PCT Pub. Date: Dec. 23, 2015

(65) Prior Publication Data
US 2017/0127086 A1    May 4, 2017

Related U.S. Application Data

(60) Provisional application No. 62/014,229, filed on Jun. 19, 2014.

(51) Int. Cl.
H04N 19/90    (2014.01)
H04N 19/597    (2014.01)
(Continued)

(52) U.S. Cl.
CPC .......... *H04N 19/597* (2014.11); *H04N 19/15* (2014.11); *H04N 19/90* (2014.11); *H04N 19/174* (2014.11);
(Continued)

(58) Field of Classification Search
None
See application file for complete search history.

(56) References Cited

U.S. PATENT DOCUMENTS 4,484,187 A * 11/1984 Brown ............... G09G 5/06
345/589
5,119,186 A * 6/1992 Deacon ............. G06T 11/001
345/600
(Continued)

FOREIGN PATENT DOCUMENTS

| CN | 1728833 | 2/2006 |
|---|---|---|
| CN | 101645173 | 2/2010 |

(Continued)

OTHER PUBLICATIONS

International Search Report dated Oct. 10, 2015, issued in application No. PCT/CN2015/081752.
(Continued)

*Primary Examiner* — Dave Czekaj
*Assistant Examiner* — Tyler W Sullivan
(74) *Attorney, Agent, or Firm* — Oblon, McClelland, Maier & Neustadt, L.L.P.

(57) ABSTRACT

A method and apparatus of video coding for a block of depth data or texture data coded in SSM (Single Sample Mode) are disclosed. Embodiments according to the present invention construct a sample candidate list comprising one or more single color candidates corresponding to one or more representative samples of one or more previous SSM-coded blocks, or one or more palette color candidates correspond-
(Continued)

ing to one or more previously used colors in one or more previous palettes associated with one or more palette-coded blocks, or both. A selected sample candidate is then determined from the sample candidate list and the selected sample candidate is used to encode or decode the current block by representing the whole current block by this selected sample candidate. Spatial and/or temporal candidates from previously SSM-coded blocks can also be included in the sample candidate list.

19 Claims, 3 Drawing Sheets

(51) Int. Cl.
 *H04N 19/15* (2014.01)
 *H04N 19/176* (2014.01)
 *H04N 19/186* (2014.01)
 *H04N 19/96* (2014.01)
 *H04N 19/174* (2014.01)
(52) U.S. Cl.
 CPC .......... *H04N 19/176* (2014.11); *H04N 19/186* (2014.11); *H04N 19/96* (2014.11)

(56) References Cited

U.S. PATENT DOCUMENTS

| | | | | |
|---|---|---|---|---|
| 5,692,162 | A * | 11/1997 | Okawa | G06F 3/14 345/503 |
| 7,302,006 | B2 * | 11/2007 | Apostolopoulos | H04N 19/176 375/240.24 |
| 2006/0013308 | A1 | 1/2006 | Kim | |
| 2013/0271565 | A1 * | 10/2013 | Chen | H04N 13/0048 348/43 |
| 2014/0301475 | A1 * | 10/2014 | Guo | H04N 19/50 375/240.24 |
| 2015/0016501 | A1 * | 1/2015 | Guo | G06T 9/00 375/240.02 |
| 2015/0264363 | A1 * | 9/2015 | Pu | H04N 19/186 375/240.02 |
| 2015/0281728 | A1 * | 10/2015 | Karczewicz | H04N 19/93 375/240.16 |
| 2015/0373325 | A1 * | 12/2015 | Karczewicz | H04N 19/593 375/240.13 |
| 2016/0219261 | A1 * | 7/2016 | Chen | H04N 13/0048 |
| 2017/0105003 | A1 * | 4/2017 | Lainema | H04N 19/159 |

FOREIGN PATENT DOCUMENTS

| | | |
|---|---|---|
| CN | 102075750 | 5/2011 |
| EP | 3158747 | 4/2017 |
| WO | WO 2013/158216 | 10/2013 |
| WO | 2015196104 A1 | 12/2015 |

OTHER PUBLICATIONS

Lai, et al.: "Non-SCCE3 Test D.1 Modified single color mode"; Joint Collaborative Team on Video Coding (JCT-VC) of ITU-T SG 16 WP 3 and ISO/IEC JTC 1/SC 29/WG11 (published on Jul. 6, 2014); pp. 1-7.

Chen, et al.: "Single color intra mode for screen content coding"; Joint Collaborative Team on Video Coding (JCT-VC) of ITU-T SG 16 WP 3 and ISO/IEC JTC 1/SC 29/WG11; (published on Mar. 28, 2014); pp. 1-7.

Lai, et al.: "Description of screen content coding technology proposal by MediaTek"; Joint Collaborative Team on Video coding (JCT-VC) of ITU-T SG 16 WP 3 and ISO/IEC JTC 1/SC 29/WG11; (published on Mar. 26, 2014); pp. 1-31.

Chen, et al.: "Single depth intra mode for 3D-HEVC"; Joint Collaborative Team on Video Coding (JCT-VC) of ITU-T SG 16 WP 3 and ISO/IEC JTC 1/SC 29/WG11; (published on Mar. 22, 2014); pp. 1-3.

\* cited by examiner

METHOD AND APPARATUS OF CANDIDATE GENERATION FOR SINGLE SAMPLE MODE IN VIDEO CODING

CROSS REFERENCE TO RELATED APPLICATIONS

The present invention claims priority to U.S. Provisional Patent Application Ser. No. 62/014,229, filed on Jun. 19, 2014. The U.S. Provisional Patent Application is hereby incorporated by reference in its entirety.

FIELD OF INVENTION

The present invention relates to video coding having smooth contents. In particular, the present invention relates to depth coding or video using having smooth contents.

BACKGROUND OF THE INVENTION

Three-dimensional (3D) television has been a technology trend in recent years that is targeted to bring viewers sensational viewing experience. Multi-view video is a technique to capture and render 3D video. The multi-view video is typically created by capturing a scene using multiple cameras simultaneously, where the multiple cameras are properly located so that each camera captures the scene from one viewpoint. The multi-view video with a large number of video sequences associated with the views represents a massive amount data. Accordingly, the multi-view video will require a large storage space to store and/or a high bandwidth to transmit.

Therefore, multi-view video coding techniques have been developed in the field to reduce the required storage space and the transmission bandwidth. In three-dimensional and multi-view coding systems, the texture data as well as depth data are coded.

Currently, extensions of HEVC (High Efficiency Video Coding) are being developed, including screen content coding (SCC) and 3D extensions. The screen content coding targets at coding screen captured content, with non-4:2:0 color formats, such as 4:2:2 and 4:4:4, and video data with higher bit-depths such as 12, 14 and 16 bit-per-sample while the 3D extension targets at the coding of multi-view video with depth data.

One of the mostly likely applications utilizing SCC is screen sharing, over wired-connection or wireless. For video containing screen contents, coding tools have been developed by taking into consideration of the specific characteristics of screen-content and have been demonstrated to achieve significant gains in coding efficiency. Among them, the palette coding (a.k.a. major color based coding) techniques represent block of pixels using indices to the palette (major colors), and encode the palette and the indices by exploiting spatial redundancy.

In palette coding, a block of samples are represented by indices pointing to a table of representative colors (palette). The values of colors in palette are transmitted, together with the coded index map representing the block. An Intra coding technique using single color mode is disclosed in JCTVC-Q0093 (Chen et al., *Single color intra mode for screen content coding*, Joint Collaborative Team on Video Coding (JCT-VC) of ITU-T SG 16 WP 3 and ISO/IEC JTC 1/SC 29/WG 11, 17th Meeting: Valencia, ES, 27 Mar.-4 Apr. 2014, Document: JCTVC-Q0093). In the single color mode, a block of pixels are represented by a single color, where the single color is derived from spatial and temporal candidate colors so that there is no need to transmit the color value.

The single color mode disclosed in JCTVC-Q0093 has demonstrated advantages in both improved performance (i.e., reduced bitrate) and reduced decoder complexity. It is desirable to develop techniques to further improve the coding efficiency of single color mode.

SUMMARY OF THE INVENTION

A method and apparatus of video coding for a block of depth data or texture data coded in SSM (Single Sample Mode) are disclosed. Embodiments according to the present invention construct a sample candidate list comprising one or more single color candidates corresponding to one or more representative samples of one or more previous SSM-coded blocks, or one or more palette color candidates corresponding to one or more previously used colors in one or more previous palettes associated with one or more palette-coded blocks, or both. A selected sample candidate is then determined from the sample candidate list and the selected sample candidate is used to encode or decode the current block by representing the whole current block by this selected sample candidate.

In one embodiment, the sample candidate list may correspond to the single color candidates corresponding to the representative samples of previous SSM-coded blocks. One of the single color candidates is selected as the selected sample candidate. The single color candidates can be stored in a buffer and the buffer is updated based on a first-in-first-out (FIFO) manner. Similarly, the sample candidate list may correspond to the palette color candidates corresponding to the previously used colors in the previous palettes. One of the palette color candidates is selected as the selected sample candidate. The previous palettes can be stored in a buffer and the buffer is updated based on a first-in-first-out (FIFO) manner. Furthermore, the sample candidate list may correspond to the single color candidates and the palette color candidates.

In another embodiment, the sample candidate list may also comprise spatial candidates from previously reconstructed neighboring spatial samples of the current block or temporal candidates from previously reconstructed temporal sample in or around a temporally collocated block of the current block. For example, the sample candidate list may include spatial candidates, temporal candidates and single color candidates. The selected sample candidate can be selected based on a priority order corresponding to candidate types associated with the spatial candidates, the temporal candidates and the single color candidates. The priority order from high to low may correspond to the spatial candidates, followed by the single color candidates and followed by the temporal candidates. The selected sample candidate can also be selected based on a priority order corresponding to interleaving among the spatial candidates, the temporal candidates and the single color candidates. The priority order from high to low may correspond to one spatial candidate, followed by one single color candidate and followed by one temporal candidate. The spatial candidates, the temporal candidates and the single color candidates can be stored in a buffer and the buffer is updated based on a first-in-first-out (FIFO) manner.

A selection syntax can be signaled to indicate the selected sample candidate. The selected sample candidate may also be determined implicitly without syntax signaling. For example, the selected sample candidate can be determined from the sample candidate list according to majority voting, arithmetic average, geometric average, or median of the candidates.

The single color candidates corresponding to the representative samples of the previous SSM-coded blocks, "and/ or" palette color candidates of previous palette-coded blocks, can be reset periodically. For example, the single color candidates can be reset per slice, per tile, per wavefront, per coding tree unit (CTU), or per CTU row.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

According to the single sample mode coding (e.g., the single color mode coding or the single depth mode coding), a current block is reconstructed as a uniform block having only a single sample value. The coding process of the single sample mode such as the single color mode may include, for example, constructing a list of single color candidates for a block being coded using the single sample mode. Then, a representative value is selected from the list of single color candidates. The block is then filled up with a single representative value selected from the candidate list. The selection of the color from the candidates can be signaled (e.g. index indicating the selected candidate) or derived following certain rules, such as majority voting, arithmetic average, geometric average, or median of the candidates. In the present invention, a new method to generate candidates for single sample mode is disclosed. Specifically, in addition to spatial and temporal candidates, additional candidates are generated by utilizing previously selected colors in palette coding and/or previously selected colors (i.e., previously selected representative values) for single sample mode coded blocks.

Different types of candidates can be used to construct the candidate list as described below. The following embodiments will be described using the single color mode as an example of the single sample mode. However, the same invention can also be applied to the single depth mode, where the "color" refers to the depth value.

Figure 1A:
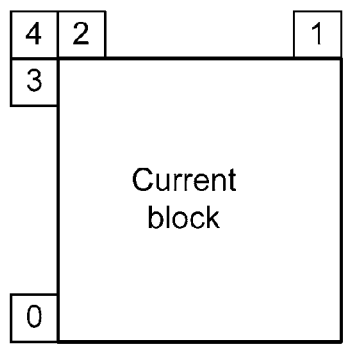
FIG. 1A-FIG. 1C illustrate three examples of spatial neighboring samples that are used to derive sample candidates for Single Sample Mode coding.
Figure 1B:
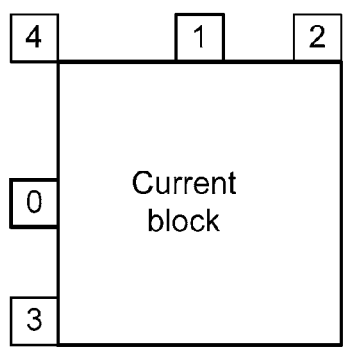
Figure 1C:
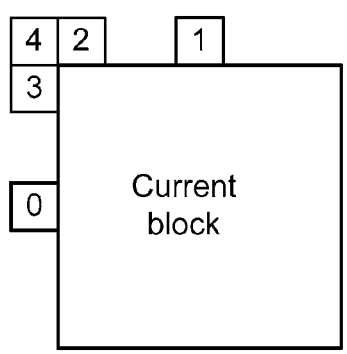

A. Spatial Sample Candidates:

Spatial sample candidates can be selected from previously reconstructed spatial neighboring pixels for the single sample mode. Three examples of spatial sample candidate selection are shown in FIG. 1A through FIG. 1C for constructing a single color (or sample value) candidate list based on spatial samples. As shown in FIG. 1A, five spatial candidates are used. The numbering indicates the order as they are inserted into the candidate list (with optional pruning process for removing the redundant/duplicate candidate among the candidate list). FIG. 1B illustrates another example of five spatial candidates, where the first sample candidate (i.e., index "0") is located at the middle location of the neighboring column adjacent to the left boundary of the current block and the second sample candidate (i.e., index "1") is located at the middle location of the neighboring row adjacent to the top boundary of the current block. FIG. 1C illustrates yet another example of five spatial candidates. The configuration of the spatial candidates is the same as that in FIG. 1B except for the locations of candidate "2" and candidate "3". The number, the locations and the ordering of the spatial candidates shown in FIG. 1A through FIG. 1C are intended to illustrate examples of spatial candidate design according to embodiments of the present invention. A person skilled in the art may practice the present invention using different configurations for the spatial candidates. In another embodiment, in order to reduce complexity while maintaining gains, only two spatial candidates are used. The first sample candidate is, for example, located at the middle location of the neighboring column adjacent to the left boundary of the current block and the second sample candidate is, for example, located at the middle location of the neighboring row adjacent to the top boundary of the current block.

B. Temporal Sample Candidates:

Samples within and/or around the collocated block in the temporal reference pictures can also be used as candidates for the single sample mode of the current block, where the collocated block resides in the temporal reference picture and has the same geometrical position as the current block in the current picture.

C. Candidate Reuse:

Besides spatial and temporal candidates, embodiments of the present invention may reuse previously coded colors from earlier blocks. Two examples are shown as follows.

C.1. Candidates from Previous Selected Single Colors of Single Sample Mode Coded Blocks In this example, the representative colors (or sample values) of previous single sample mode coded blocks can be utilized as single color candidate(s) for the current block. The representative colors selected by the previous single sample mode coded blocks can be stored in a buffer with a given size to keep track of the most recently N colors used for the single sample modes. Furthermore, an updating mechanism can be applied to the most recently N colors in the buffer. For example, the popular first-in-first-out (FIFO) buffer management scheme can be used, where the buffer removes an oldest entry when an entry needs to be removed from the buffer. The following pseudo code demonstrates an example of single ample mode decoding, where only one previously used single color is stored (i.e., N=1) for the use as a candidate for the current block.

Initialize the single_color_prev (e.g. mid-level values).
Loop over blocks:
  If current block is coded with single sample mode:
    Construct single color candidate list with candidate from single color_prev.
    Reconstruct current block using the signaled and/or derived single color selection.
    Update the single_color_prev with the selected value.
  Endif.
End loop.

i. Final Single Color Selection from the Candidate List

Candidate list with more than one previously selected single color from more than one previous single sample mode coded blocks can be constructed following the same spirit. When there are multiple candidates in the list, the selection of the final candidate for the current block needs to be signaled or derived. For explicit signaling, part or all the candidates can be used in the selection set and the signaled syntax will identify the final candidate selected from the set. Alternatively, the final candidate can be determined implicitly by deriving the final candidate according to a rule. The rule is also known to the decoder side and therefore, there is no need of explicit signaling. For example, the rule may correspond to the majority voting for the candidates, arithmetic average, geometric average, or median of the candidates.

ii. Mixed Type of Candidates

The reused candidate(s) from previous single sample mode can be combined with the candidates from spatial and/or temporary samples. For example, the two middle-of-line candidates (i.e., candidates "0" and "1") shown in FIG. 1B and FIG. 1C can be used as the first two candidates in the list. In addition, one or more single color candidates from the representative colors of previous single sample mode coded blocks can be added to the two spatial candidates. In another example, the mixed type of candidates may first select a number of spatial candidates, followed by a number of previous single color candidates, and further followed by temporal candidates from the reference pictures. Both the spatial candidates and previous single color candidates are from the current picture. In one embodiment, the candidates of different types can be stored in a buffer and the buffer is updated based on a first-in-first-out (FIFO) manner.

iii. Ordering

In the above examples, the spatial candidates have always been placed in front of previous single color candidates. When temporal candidates are used, the temporal candidates have been placed after the previous single color candidates. However, other priority orderings using mixtures of candidates can also be easily constructed. For example, the orders may correspond to {set of spatial candidates, set of temporal candidates, set of previous single color candidates} or {set of spatial candidates, set of previous single color candidates, set of temporal candidates}. Furthermore, the ordering of candidates does not have to be grouped by their types. Instead, candidates from different sets can be interleaved. For example, the ordering may correspond to {spatial candidate 1, previous single color candidate 1, spatial candidate 2, previous single color candidate 2, . . . }.

iv. Reset of the Single Color Candidates

The single color candidates from the representative colors of previous single sample mode coded blocks can be reset periodically. The periodic reset provides the benefit for parallel processing as well as error resilience. The reset period can be coarse and directly related to parallel processing tools, such as per slice, per tile, or per wavefront. If desired, finer granularity such as per coding tree unit (CTU) row or per CTU can also be applied. It is well known for advanced video coding that the pictures in a sequence may be configured into different units for exploiting local characteristics, parallel processing or other purposes. For example, in the HEVC (high efficiency video coding) standard, a picture can be partitioned into tiles, slices, CTU or CTU row. Furthermore, wavefront parallel processing (WPP) has also been available for HEVC as a tool to use dependency between CTU rows while allowing parallel processing of CTU rows. For a system supporting WPP, the reset can be applied to each wavefront.

In this example, when palette mode is also used, the single sample mode utilizes previously used colors in the palette as candidates for the representative color of the single sample mode coded block. Maintenance and updating mechanism for storing previously used palette exists already according to the current palette coding techniques. Therefore, the same maintenance and updating mechanism can be used for previously used palettes. For example, the palette color candidates can be stored in a buffer and the buffer is updated based on a first-in-first-out (FIFO) manner. The candidate list construction for the single sample mode coding of the current block can be independent of the palette updating. Existing palette predictor as used in the palette coding can be used to select the color predictor from the maintained palette predictor. The palette predictor can be used either alone or jointly with other candidates such as candidates of single sample mode. Various priority orderings of the candidates can be used. For example, the first N entries in the stored palette predictor can be inserted into the single color candidate list. In another embodiment example, the encoder may signal the index (or indices) to indicate the color(s) in the palette predictor used as candidates for the single sample mode coding of the current block.

i. Selection from the Candidate List.

When there are multiple candidates in the list, such as N entries from the palette predictors, the selection of which candidate value to be used for the current block has to be either signaled or derived, as discussed previously.

ii. Mixed Type of Candidates

The candidate(s) selected from previously used palette(s) can be used in conjunction with candidates from spatial and/or temporary samples, and/or even the candidates from previously used single colors as described above. For example, at least one of the two middle-of-line candidates (i.e., candidates "0" and "1") in FIG. 1B and FIG. 1C can be used as the first or the first two candidates in the list, followed by one or more candidates from the top entries of the stored palette(s). Other combinations of mixed type of candidates can be constructed, such as spatial candidates, followed by palette predictor candidates, and then followed by temporal candidates from reference pictures. Both the spatial candidates and previous single color candidates are from the current picture. In one embodiment, the candidates of different types can be stored in a buffer and the buffer is updated based on a first-in-first-out (FIFO) manner.

iii. Ordering

In the above example, spatial candidates have been placed in front of candidates from palette predictor. Nevertheless, other priority ordering using mixtures of candidates can also be used. For example, the ordering may correspond to {set of spatial candidates, set of temporal candidates, set of candidates from palette predictor} or {set of spatial candidates, set of candidates from palette predictor, set of temporal candidates}. Furthermore, the ordering of candidates does not have to be grouped by their types. Candidates from different sets can be interleaved. For example, the ordering may correspond to {spatial candidate 1, candidate 1 from palette predictor, spatial candidate 2, candidate 2 from palette predictor, . . . }.

iv. Reset of the Palette Color Candidates

The single color candidates from the palette color candidates of previous blocks can be reset periodically. The periodic reset provides the benefit for parallel processing as well as error resilience. The reset period can be coarse and directly related to parallel processing tools, such as per slice, per tile, or per wavefront. If desired, finer granularity such as per CTU lines or even per CTU can also be applied.

Figure 2:
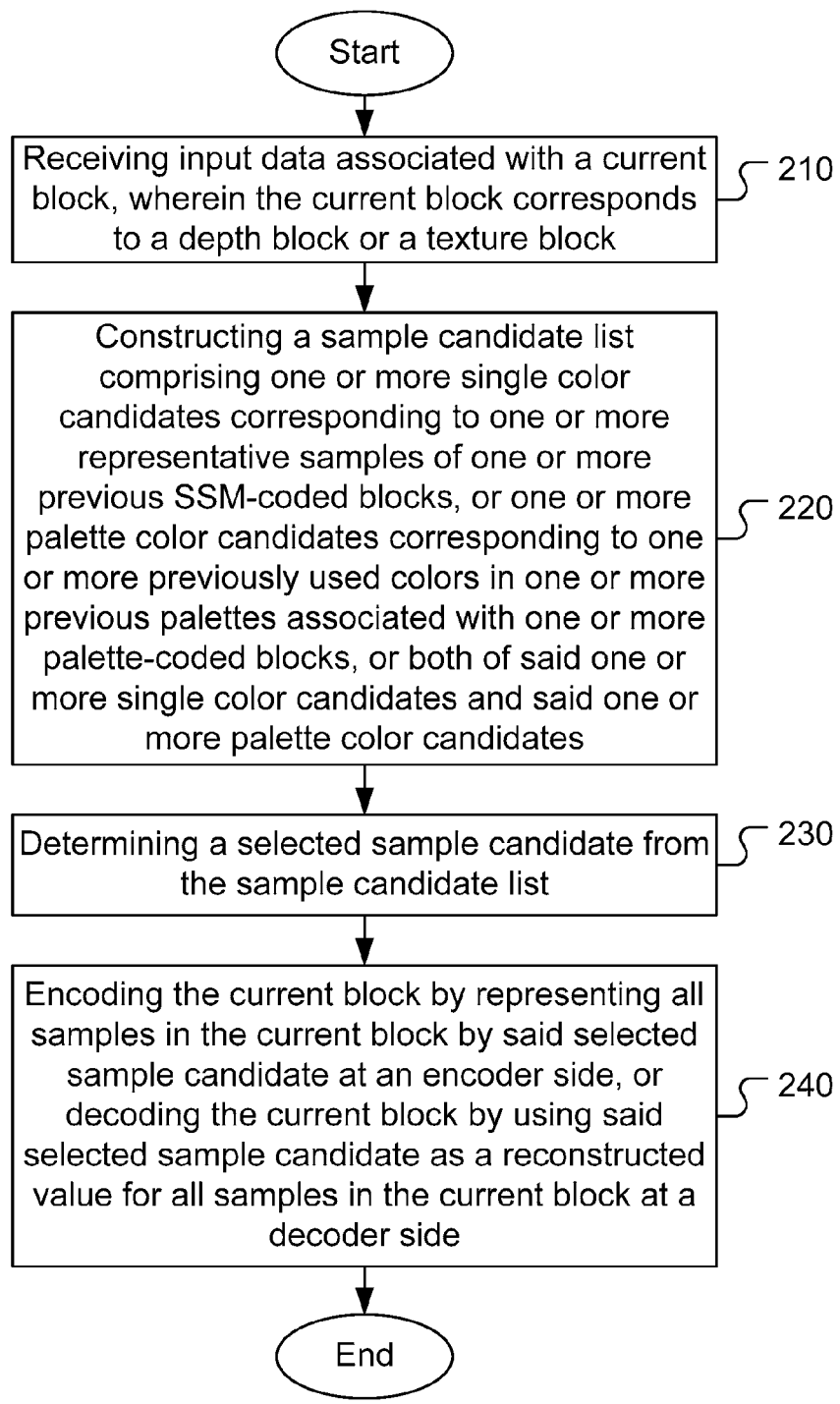
FIG. 2 illustrates an exemplary flowchart for a system incorporating Single Sample Mode coding according to an embodiment of the present invention.

FIG. 2 illustrates an exemplary flowchart of Single Sample Mode coding for depth data or texture data according to an embodiment of the present invention. The system receives input data associated with a current depth block or a current texture block as shown in step 210. For encoding, the input data associated with the current depth block or the current texture block corresponds to the depth samples or pixel values to be coded. For decoding, the input data associated with the current depth block or the current texture block corresponds to the coded depth data or coded video pixel data to be decoded. The input data associated with the current depth block may be retrieved from memory (e.g., computer memory, buffer (RAM or DRAM) or other media) or from a processor. A sample candidate list is constructed in step 220, where the sample candidate list comprises one or more single color candidates corresponding to one or more representative samples of one or more previous SSM-coded blocks, or one or more palette color candidates corresponding to one or more previously used colors in one or more previous palettes associated with one or more palette-coded blocks, or both of said one or more single color candidates and said one or more palette color candidates. A selected sample candidate is determined from the sample candidate list in step 230. The current block is then encoded or decoded by representing all samples in the current block by said selected sample candidate in step 240.

Figure 3:
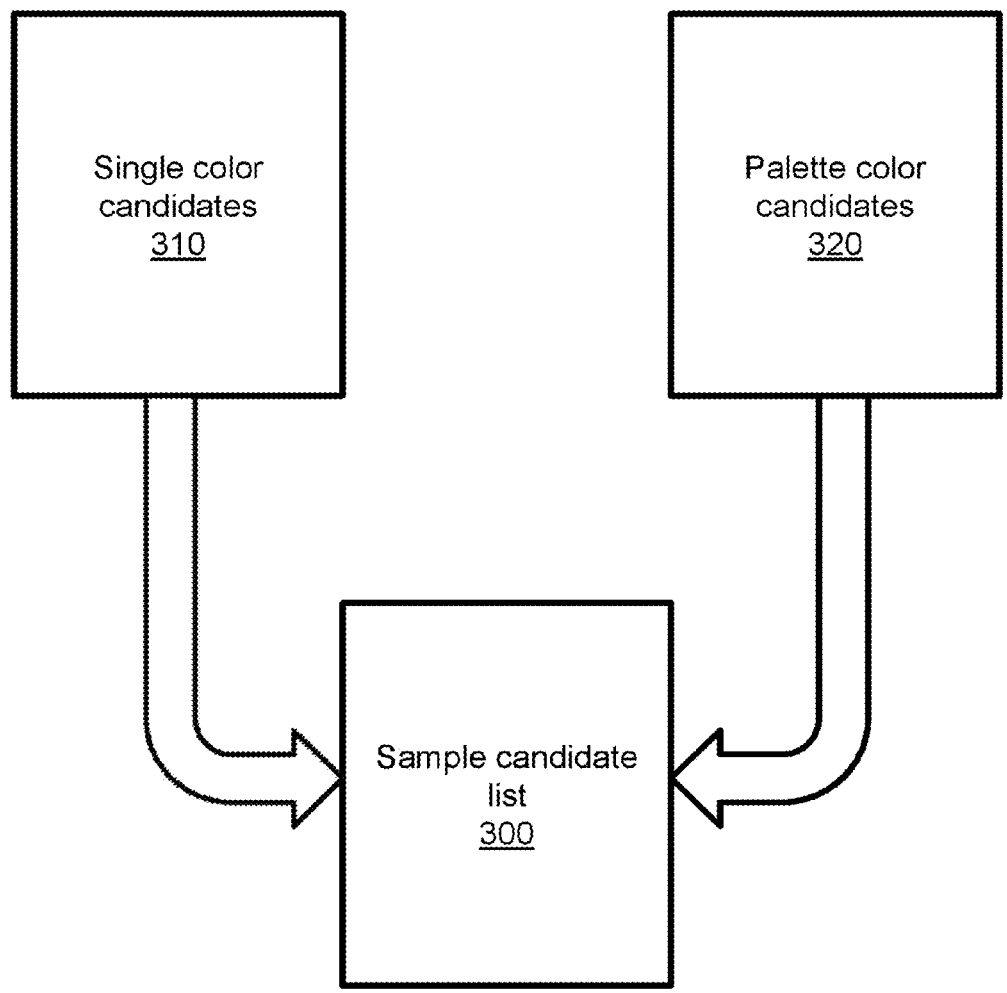
FIG. 3 illustrates a diagram of a construction of a sample candidate list according to an embodiment of the present disclosure.

FIG. 3 illustrates a diagram of a construction of a sample candidate list according to an embodiment of the present disclosure. As shown in FIG. 3, a sample candidate list 300 may be constructed from one or more single color candidates 310 corresponding to one or more representative samples of one or more previous SSM-coded blocks, or one or more palette color candidates 320 corresponding to one or more previously used colors in one or more previous palettes of a plurality of colors associated with one or more palette-coded blocks, or both of said one or more single color candidates 310 and said one or more palette color candidates 320.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding for a block of depth data or texture data coded in SSM (Single Sample Mode), the method comprising:
    receiving input data associated with a current block, wherein the current block corresponds to a depth block or a texture block;
    constructing a sample candidate list comprising one or more single color candidates corresponding to one or more representative samples of one or more previous SSM-coded blocks, or one or more palette color candidates corresponding to one or more previously used colors in one or more previous palettes of a plurality of colors associated with one or more palette-coded blocks, or both of said one or more single color candidates and said one or more palette color candidates;
    determining a single selected sample candidate from the sample candidate list; and
    encoding the current block by representing all samples in the current block by said single selected sample candidate at an encoder side, or decoding the current block by using said single selected sample candidate as a reconstructed value for all samples in the current block at a decoder side,
    wherein the sample candidate list further comprises one or more spatial candidates from previously reconstructed neighboring spatial samples of the current block, one or more temporal candidates from previously reconstructed temporal sample in or around a temporally collocated block of the current block, and said one or more single color candidates, and
    wherein said single selected sample candidate is selected based on a priority order corresponding to one of: (i) candidate types associated with said one or more spatial candidates, said one or more temporal candidates, and said one or more single color candidates, and (ii) interleaving among said one or more spatial candidates, said one or more temporal candidates, and said one or more single color candidates.

2. The method of claim 1, wherein the sample candidate list comprises said one or more single color candidates corresponding to said one or more representative samples of said one or more previous SSM-coded blocks; and one of said one or more single color candidates is selected as said single selected sample candidate.

3. The method of claim 2, wherein said one or more single color candidates are stored in a buffer and the buffer is updated based on a first-in-first-out (FIFO) manner.

4. The method of claim 1, wherein the sample candidate list comprises said one or more palette color candidates corresponding to said one or more previously used colors in said one or more previous palettes; and one of said one or more palette color candidates is selected as said single selected sample candidate.

5. The method of claim 4, wherein said one or more previous palettes are stored in a buffer and the buffer is updated based on a first-in-first-out (FIFO) manner.

6. The method of claim 1, wherein the sample candidate list comprises said one or more single color candidates and said one or more palette color candidates corresponding to said one or more previously used colors in said one or more previous palettes; and one of said one or more single color candidates and said one or more palette color candidates is selected as said single selected sample candidate.

7. The method of claim 6, wherein said one or more single color candidates and said one or more previous palettes are stored in a buffer and the buffer is updated based on a first-in-first-out (FIFO) manner.

8. The method of claim 1, wherein the priority order from high to low corresponds to said one or more spatial candidates, followed by said one or more single color candidates and followed by said one or more temporal candidates.

9. The method of claim 1, wherein the priority order from high to low corresponds to one spatial candidate, followed by one single color candidate and followed by one temporal candidate.

10. The method of claim 1, wherein said one or more spatial candidates, said one or more temporal candidates and said one or more single color candidates are stored in a buffer and the buffer is updated based on a first-in-first-out (FIFO) manner.

11. The method of claim 1, wherein a selection syntax is signaled to indicate said single selected sample candidate.

12. The method of claim 1, wherein said single selected sample candidate is determined implicitly without syntax signaling.

13. The method of claim 12, wherein said single selected sample candidate is determined from the sample candidate list according to majority voting, arithmetic average, geometric average, or median of the candidates.

14. The method of claim 1, wherein a selection syntax is signaled to indicate said single selected sample candidate.

15. The method of claim 1, wherein said single selected sample candidate is determined implicitly without syntax signaling.

16. The method of claim 15, wherein said single selected sample candidate is determined from the sample candidate list according to majority voting, arithmetic average, geometric average, or median of the candidates.

17. The method of claim 1, wherein said one or more single color candidates, said one or more palette color candidates, or both of said one or more single color candidates and said one or more palette color candidates are reset periodically.

18. The method of claim 1, wherein said one or more single color candidates, said one or more palette color candidates, or both of said one or more single color candidates and said one or more palette color candidates are reset per slice, per tile, per wavefront, per coding tree unit (CTU), or per CTU row.

19. An apparatus of video coding for a block of depth data or texture data coded in SSM (Single Sample Mode), the apparatus comprising one or more electronic circuits configured to:
receive input data associated with a current block, wherein the current block corresponds to a depth block or a texture block;
construct a sample candidate list comprising one or more single color candidates corresponding to one or more representative samples of one or more previous SSM-coded blocks, or one or more palette color candidates corresponding to one or more previously used colors in one or more previous palettes of a plurality of colors associated with one or more palette-coded blocks, or both of said one or more single color candidates and said one or more palette color candidates;
determine a selected sample candidate from the sample candidate list; and
encode the current block by representing all samples in the current block by said single selected sample candidate at an encoder side, or decode the current block by using said single selected sample candidate as a reconstructed value for all samples in the current block at a decoder side,
wherein the sample candidate list further comprises one or more spatial candidates from previously reconstructed neighboring spatial samples of the current block, one or more temporal candidates from previously reconstructed temporal sample in or around a temporally collocated block of the current block, and said one or more single color candidates, and
wherein said single selected sample candidate is selected based on a priority order corresponding to one of: (i) candidate types associated with said one or more spatial candidates, said one or more temporal candidates, and said one or more single color candidates, and (ii) interleaving among said one or more spatial candidates, said one or more temporal candidates, and said one or more single color candidates.

* * * * *